United States Patent [19]

Hayward

[11] 4,206,479
[45] Jun. 3, 1980

[54] BUFFERED TIME BASE CORRECTION CIRCUIT

[75] Inventor: John S. Hayward, Victor, N.Y.

[73] Assignee: Eastman Kodak Company, Rochester, N.Y.

[21] Appl. No.: 16,051

[22] Filed: Feb. 28, 1979

Related U.S. Application Data

[63] Continuation-in-part of Ser. No. 872,716, Jan. 26, 1978, abandoned.

[51] Int. Cl.² .............................................. H04N 5/76
[52] U.S. Cl. ...................................... 358/160; 358/8; 360/36
[58] Field of Search ................... 358/8, 160; 360/36, 360/37

[56] References Cited

U.S. PATENT DOCUMENTS

| | | | |
|---|---|---|---|
| 3,947,874 | 3/1976 | Lentz | 360/36 |
| 4,074,307 | 2/1978 | Dischert et al. | 358/8 |
| 4,133,009 | 1/1979 | Kittler et al. | 360/9 |

*Primary Examiner*—Robert L. Richardson
*Attorney, Agent, or Firm*—Robert F. Cody

[57] ABSTRACT

A time base corrector for use in defluttering video signals employs a pair of analog shift registers which functionally sandwich a buffer register. Signals are serially applied to one register, say at a fluttering rate; then parallel shifted to the buffer register; then parallel shifted to the second analog shift register; then serially clocked out of the second analog shift register at a reference rate. With such signal processing, successive signals always follow the same signal path, thereby avoiding the prior art need for complementary circuit components. Components of the time base corrector form parts of a solid state device, means being provided therefor to assure that charge vestiges cannot occur after charge shifting.

4 Claims, 5 Drawing Figures

FIG. 1
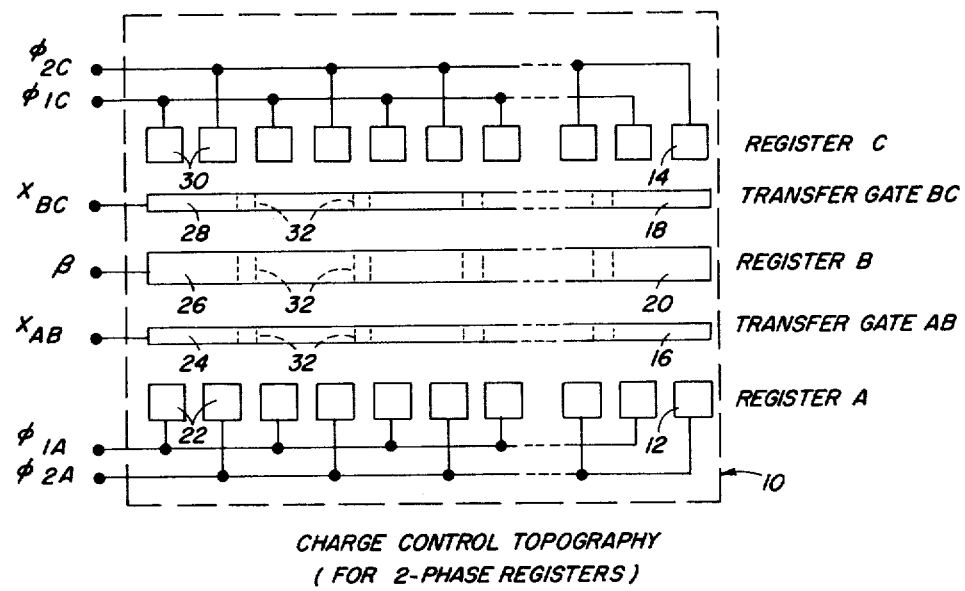
CHARGE CONTROL TOPOGRAPHY
(FOR 2-PHASE REGISTERS)
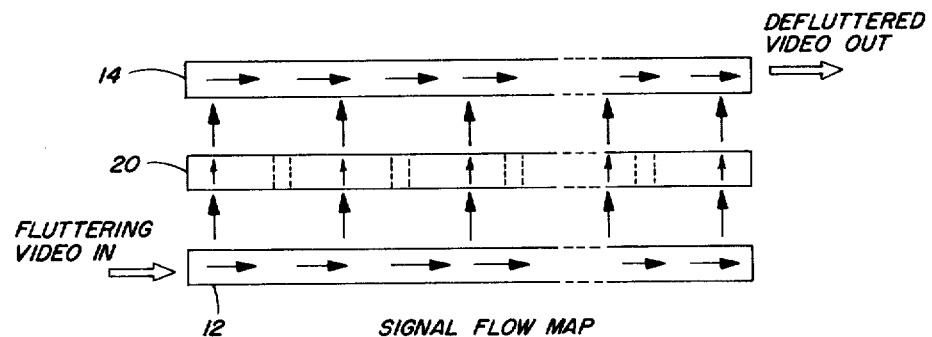
SIGNAL FLOW MAP
FIG. 2

SIMPLIFIED TIMING DIAGRAM (ASSUMED N=9, M=2, P=1 AND SIGNAL LEVEL="1" INDICATES CREATION OF A CHARGE WELL)

4,206,479

BUFFERED TIME BASE CORRECTION CIRCUIT

CROSS-REFERENCE TO RELATED APPLICATION

This is a continuation-in-part of my earlier filed application Ser. No. 872,716, filed on Jan. 26, 1978 and now abandoned.

U.S. Application Ser. No. 872,718 entitled TIME BASE CORRECTION CIRCUIT EMPLOYING CONTROLLED PARALLEL SIGNAL TRANSFERS BETWEEN ANALOG STORAGE REGISTERS to J. R. Horak, filed of even date herewith; the disclosure of which is hereby incorporated herein by reference.

BACKGROUND OF THE INVENTION

1. Field of the Invention

The present invention relates to apparatus for applying time base corrections to video signals.

2. Description Relative to the Prior Art

When transmitting video signals, particularly where record/playback operations are employed, it is a problem to maintain a time base consistent with a standard format for video signals, for example, the conventional NTSC signal format. Time base departures from the standard, say the 63.5 μsec. period over one line of a video frame with the NTSC standard, may occur for a wide range of frequencies and are generally referred to as signal flutter.

A TV set typically tolerates low-amplitude flutter at low frequencies, employing for such purpose circuits which loosely slave the TV display to the time base of the received signal. (To lock the display tightly to the signal time base would introduce objectionable instabilities.) In the case of record/playback systems phase-lock-type speed controls can, for practical purposes, eliminate low frequency flutter, viz flutter at frequencies below the video field frequency. Higher frequency flutter, which may result from such causes as recording-tape stretch variations and transmission-time variations, proves more difficult to avoid. Such flutter, moreover, is not easily compensated for in the signal processing of a TV set, and can result in picture distortions or other irritating display problems.

One solution to the higher frequency flutter problem, in the case of digital video signals (or analog signals with suitable conversion), is to store coded signal components in a digital storage buffer at the incoming rate and then retrieve such components for output in the same sequence and at a standard rate. The storage buffer then absorbs the short time variations by, in effect, expanding and compressing in length in accordance with the differentials in signal rates (see e.g. U.S. Pat. No. 3,860,952). This approach, while effective, is expensive and is best suited to broadcast studio systems.

A defluttering approach more suited to consumer video systems employs analog shift registers to remove flutter. With this approach video signals are typically read into registers, one-line-per-register, at the incoming signal rate. Two or more registers receive the signals sequentially and the signal information is read out at the standard rate in the same sequence (see e.g. U.S. Pat. No. 3,931,638). While such an approach is effective for time base correction it does tend to require a great deal of clocking signal and video signal switching. See, also, Fairchild Journal of Semiconductor Progress, Vol. 3, No. 5, Sept., Oct. 1975, pages 16, 17, which discloses a defluttering technique employing input and output registers which sandwich a gate structure adapted for parallel transfer of signals from the input register to the output register.

SUMMARY OF THE INVENTION

Copending U.S. patent application Ser. No. 872,718 to J. R. Horak filed on even date herewith teaches an advantageous technique for time base correction of video signals that involves controlled parallel transfer of video line signals (i.e., signals corresponding to scan lines) among a set of analog registers. The present invention provides an improvement over such time base correction, being steeped in a special signal transfer sequence that results in the relegating of input and output activities to respective registers. More specifically, by successive parallel shifts of line signals in essentially one direction from input to output (such shifts including controlled parallel transfers to one or more registers for intermediate buffer storage) simplification of clocking and of register structure for time base correction is achieved. That is to say, because successive line signals always follow the same signal path (a feature not possible with the teaching of Horak), the toggling of switching signals is obviated.

In a presently preferred implementation, video line signals are read into a first charge-transfer-type analog shift register and, when such register is full, image representative charge packets are parallel shifted to a juxtaposed set of separate buffer charge wells (such wells need not include an electrode structure for series shifting) under the control of a transfer electrode structure. A subsequent parallel shift of the charge packets to an output analog shift register is triggered, under the control of a second transfer electrode structure, when the output analog shift register is ascertained to be empty. Preferably, the buffer charge wells are formed under a common electrode; and well-separation is achieved using barrier diffusions.

The invention will now be described in detail with reference to the drawings, wherein:

FIG. 1 is a diagram indicating a presently preferred electrode topography for controlling the transfer of image representative charge packets according to the invention;

FIG. 2 is a diagram indicating a presently preferred signal flow pattern according to the invention;

Figure 3A:
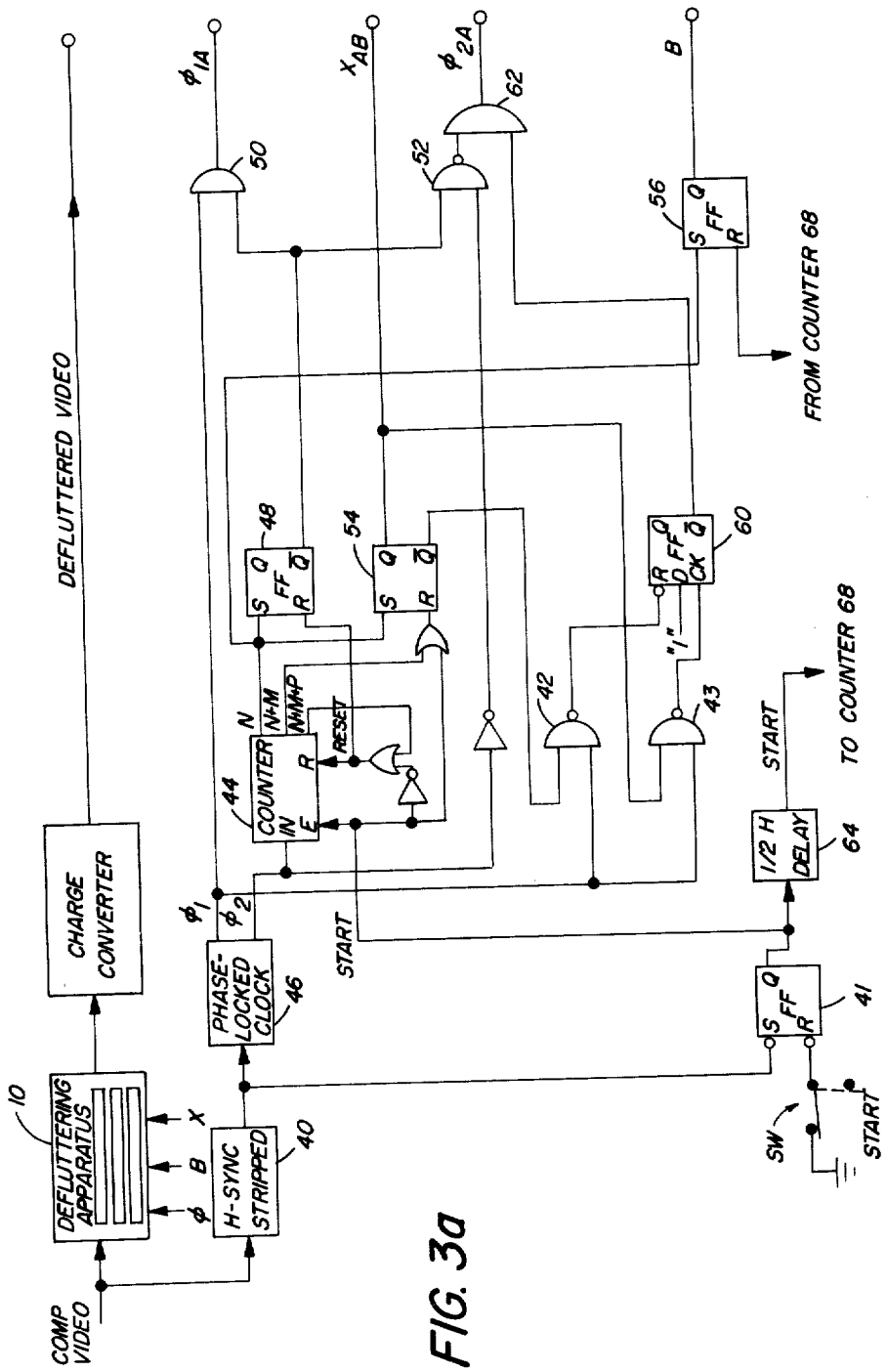
FIG. 3 (a, b) is a diagram indicating a circuit for generating control signals to drive the defluttering registers for the presently preferred implementation of the invention.

Referring to FIG. 1, the invention is preferably implemented in the form of a solid state device 10 employing a pair of charge transfer devices such as charge coupled devices (CCDs) 12, 14. The CCDs 12, 14 are separated (functionally) from each other by a gate (16, 18)—and—buffer (20) structure; and although the charge transfer devices are depicted as two-phase CCDs, it will be appreciated that other charge transfer devics, such as, for example, three-phase CCDs, are also useful in the practice of the invention.

As is the practice in the art, the surface of the solid state device 10 is covered with a SiO₂ layer over which electrodes (e.g., aluminum or polysilicon) 22, 24, 26, 28 and 30 are deposited . . . the bulk of the solid state device begin preferably provided with suitable diffusion barriers 32 for limiting and controlling the movement of signal charge under action of the device electrodes.

OVERVIEW

Before describing the details of an actual circuit for use, with the solid state device of FIG. 1, for correcting the time base of video signals, the following overview is presented in an attempt to simplify an understanding of the invention (see FIG. 2, as well as FIG. 1): Assuming, say, a fluttering video signal apears at the input of the device 10, a fluttering clock signal ($\phi_{1A}$, $\phi_{2A}$) is produced—as will be described later—to clock samples of the fluttering video signals into the CCD 12. As soon as the stages of the CCD 12 are loaded, a gate "transfer" signal ($X_{AB}$) and a depletion-well signal (B) are produced, causing the charge in the "$\phi_2$ potential wells" of the CCD 12 to transfer into corresponding stages of the buffer 20. With signal charge now residing in the buffer 20, the input CCD 12 is readied to receive the next fluttering video signal. When the CCD register 12 is (about) half loaded with samples of the next fluttering video signal, a gate "transfer" signal ($X_{BC}$) is produced, causing the signal charge in the buffer 20 to shift to corresponding stages of the output CCD 14, a stable clock ($\phi_{1C}$, $\phi_{2C}$) being applied to unload the output CCD register 14 at an "unfluttered" reference rate. Thereafter, the above signal processing is repeated.

In the showing of FIG. 2, note should be taken that one and only one register "sees" fluttering input signals; and one and only one register provides an unfluttered output signal. This means that successive video signals are not subjected to different circuit devices and conditions and, attendantly, signal processing is simplified.

Figure 3B:
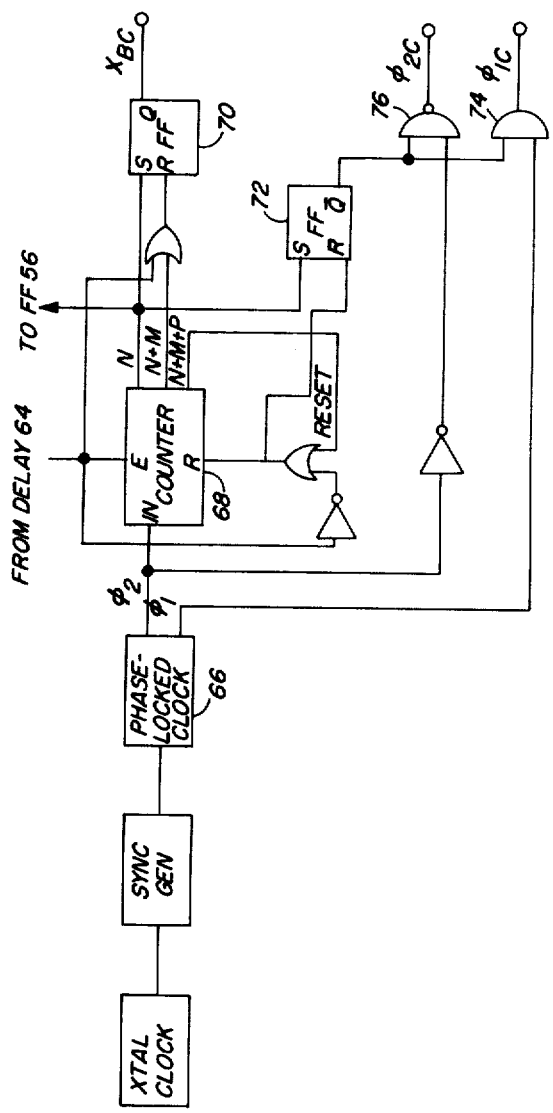
Figure 4:
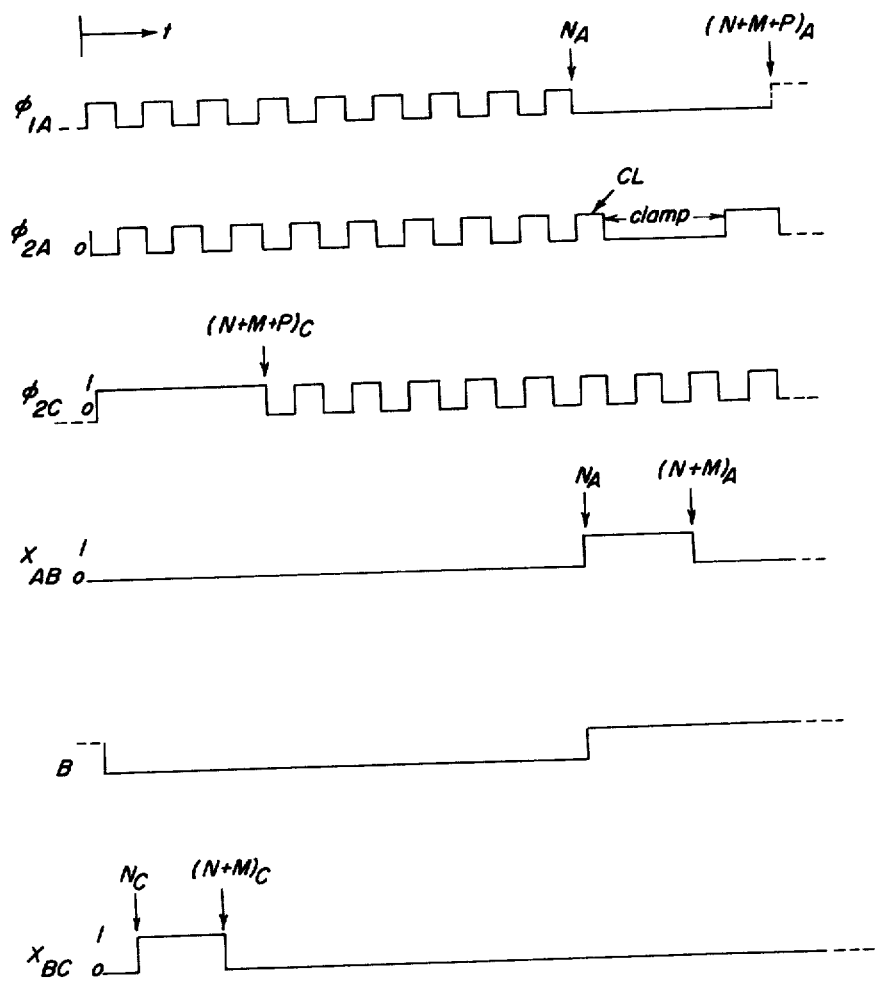
FIG. 4 is a simplified timing diagram for control signals produced by the circuit of FIG. 3.

With the above overview in mind, reference should now be had to FIGS. 3 and 4 for a discussion of details employed in the practice of the invention:

As a stream of, say fluttering, video signals is applied to the solid state defluttering device 10, the fluttering sync signals of the signal stream are stripped off (40) and, assuming a start switch SW had been actuated, the first sync signal exiting from the sync stripper 40 sets flip-flop 41 which enables a clock counter 44 and removes the reset input to flip-flops 48, 54 and after one-half H delay to flip-flops 70 and 72, and counter 68 thereby setting up initial conditions for circuit operation. The fluttering sync signals are also applied to a phase lock loop circuit 46 which produces fluttering two-phase clocking signals for application to the CCD register A (12).

Clocking signals ($\phi_2$) from the phase lock loop circuit 46 are applied to the counter 44 which, in response to a count N—N being the number of stages of the register A and, thus, the count N indicates that the register A is full—switches a flip-flop 48 to its set condition, thereby closing gates 50, 52 to end the appliction of fluttering clocking signals $\phi_{1A}$, $\phi_{2A}$ to the CCD register A (12).

At the instant clocking signals stop being applied to the CCD register A (12), signals $X_{AB}$ and B (see FIG. 1) are respectively applied to the transfer gate AB (16) and to the buffer register B (20), thereby to transfer the register A signal charge to the register B. To this end, the N count signal of the counter 44 is applied to set flip-flops 54 and 56.

As an aid to the transfer of register A signal charge to the buffer register B, the $\phi_2$ potential wells of the CCD register A are subjected to a "down" potential state during the time of charge transfer . . . which is to say that the register A potential wells vanish as the register B wells are created. This is akin to "squeegeeing" signal charge from the register A to the register B. Such squeegeeing effect is produced by the clamp signal of FIG. 4 which occurs as follows: At the clock pulse count N, the Q output of the flip-flop 48 goes "down", the $\phi_2$ output of the phase lock loop 46 being also "down" at the time of the N count (see FIG. 4). This means that, at the time of the N count the gate 52 output is "up". During the next $\phi_2$ clock pulse output of the phase lock loop 46 (which is to say that the $\phi_1$ pulse is not occurring)—see pulse CL, FIG. 4—the $\overline{Q}$ output of a flip-flop 60 is "up". The $\overline{Q}$ output of the flip-flop 60 is applied to a gate 62 along with the output of the gate 52. And, with both inputs to the gate 62 "up," that gate's output is also "up". When the next $\phi_1$ pulse occurs (which is to say that the $\phi_2$ pulse does not occur) the $\overline{Q}$ output of the flip-flop 60 goes "down", causing the $\phi_{2A}$ output to go "down" as well, thereby starting the clamp period. The clamp period remains until the flip-flop 54 is reset in response to a N+M count after which flip-flop 60 is reset by a $\phi_1$ pulse, and $\phi_{2A}$ returns to the "up" condition. The clocking and resetting of flip-flop 60 by $\phi_1$ are controlled by gates 42 and 43 which are opened and closed by flip-flop 54. At a count of N+M+P, the flip-flop 48 is reset. This, along with the fact that the flip-flops 54 and 60 had been reset at the count N+M, again causes fluttering clock signals $\phi_{1A}$ and $\phi_{2A}$ to appear at the outputs of the gates 50, 62 for clocking the next fluttering video line signal into the register A (12).

On average, at one-half H (64), i.e. the well known 63.5 $\mu$sec. duration of a television line in the NTSC system, after a fluttering video line signal has been clocked into the register A (12) and shifted to the buffer register B, stable clocking signals, produced by means of a crystal clock-sync generator in combination with a phase lock loop 66, start to clock that line signal out of the register C (14). To effect transfer of signal charge from the buffer register B to the output register C, the stable clocking signals are applied to and counted in a counter 68. At the count N of the counter 68, a flip-flop 70 is set, causing the transfer signals $X_{BC}$ to be applied to the transfer gate BC (18). This effects a transfer of the buffered (20) signal charge into the output CCD shift register C (14). At the time of such transfer, clocking signals to the register C are interrupted by action of a flip-flop 72; and after the signal charge transfer, i.e. at a count (68) of N+M, the flip-flop 70 is reset.

With signal charge residing in the CCD register C (14), and at a count N+M+P of the counter 68, the flip-flop 72 is reset, opening gates 74, 76 to stable clock signals $\phi_1$, $\phi_2$ from the phase lock loop 66. Thus, at nominally one-half H time after a fluttering video signal has completely filled the CCD register A (12) a non-fluttering version of that video signal starts to exit from the CCD register C (14). And, so long as the degree of flutter does not correspond to a time base shift in excess of one-half H, apparatus embodying the invention will eliminate the effects of such flutter.

As successive signals are applied to the input of the device 10, they are similarly processed, it being again emphasized that, by means of the invention, all signals are constrained to processing by the same processing electronics.

The invention has been described in detail with particular reference to certain preferred embodiments thereof, but it will be understood that variations and modifications can be effected within the spirit and scope of the invention.

What is claimed is:

1. Apparatus capable of removing flutter from a fluttering signal in the form of a succession of signal representative charge pockets comprising:
   (a) first and second charge transfer devices;
   (b) buffer means;
   (c) first gate means for parallel transferring charge pockets from said first charge transfer device to said buffer means;
   (d) second gate means for parallel tranferring charge pockets from said buffer means to said second charge transfer device;
   (e) means for serially processing charge pockets into said first charge transfer device;
   (f) means for serially processing charge pockets to the output of said second charge transfer device;
   (g) means for producing first clocking signals corresponding to the time base of the succession of charge pockets processed into said first charge transfer device;
   (h) means for producing second clocking signals at a reference rate;
   (i) means for applying said first clocking signals to said first charge transfer device;
   (j) means for applying said second clocking signals to said second charge transfer device;
   (k) means cooperative with said first charge transfer device for producing a first gate signal to actuate said first gate means when a predetermined number of stages of said first charge transfer device are occupied by charge pockets; and
   (l) means, cooperative with said second charge transfer device and operable after a predetermined time interval following actuation of said first gate means for actuating said second gate means, thereby to transfer signal representative charge pockets in said buffer means to said second charge transfer device.

2. The apparatus of claim 1 wherein said first and second charge transfer devices are respectively first and second charge coupled devices and wherein said charge coupled devices, said buffer means, and said gate means form respective parts of a common solid state device.

3. The apparatus of claim 2 including means for producing and applying a clamp signal to the stages of said first charge coupled device simultaneously with the actuation of said first gate means, thereby to effect transfer of charge from said first charge coupled device to said buffer means.

4. Apparatus capable of altering the time base of a signal consisting of a stream of charge pockets, comprising:
   (a) a first charge coupled device;
   (b) a second charge coupled device;
   (c) means for clocking said first charge coupled device at a respective rate;
   (d) means for clocking said second charge coupled device at a respective rate;
   (e) buffer means;
   (f) means for processing said charge pockets serially into said first charge coupled device;
   (g) means cooperative with said first charge coupled device for parallel shifting charge pockets in the stages thereof to corresponding stages of said buffer means;
   (h) means cooperative with said buffer means for parallel shifting charge pockets in the stages thereof to corresponding stages of said second charge coupled device; and,
   (i) clamp means, cooperative with said means for parallel shifting charge pockets to said buffer means, for depleting the potential wells of said first charge coupled device while shifting said charge pockets.

* * * * *